(12) United States Patent
Happel

(10) Patent No.: US 11,253,798 B2
(45) Date of Patent: *Feb. 22, 2022

(54) NUTRIENT REMOVAL FILTRATION SYSTEM AND METHOD

(71) Applicant: OLDCASTLE INFRASTRUCTURE, INC., Auburn, WA (US)

(72) Inventor: Thomas Happel, Cocoa, FL (US)

(73) Assignee: Oldcastle Infrastructure, Inc., Auburn, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/908,888

(22) Filed: Jun. 23, 2020

(65) Prior Publication Data

US 2020/0316496 A1 Oct. 8, 2020

Related U.S. Application Data

(60) Division of application No. 15/952,803, filed on Apr. 13, 2018, now abandoned, which is a division of
(Continued)

(51) Int. Cl.
*E03F 5/14* (2006.01)
*B01D 21/00* (2006.01)
(Continued)

(52) U.S. Cl.
CPC ..... *B01D 21/0012* (2013.01); *B01D 21/0042* (2013.01); *B01D 21/2472* (2013.01);
(Continued)

(58) Field of Classification Search
CPC ......... E03F 5/0403; E03F 5/0404; E03F 5/14; B01D 21/0012; B01D 21/0042; B01D 24/16; B01D 24/165; B01D 2101/04
(Continued)

(56) References Cited

U.S. PATENT DOCUMENTS 122,209 A 12/1871 Ashman
232,948 A 10/1880 Dernham
(Continued)

FOREIGN PATENT DOCUMENTS

FR 2916458 A1 11/2008
JP 2004353407 A 12/2004

OTHER PUBLICATIONS

Bio-Clean, Submittal Drawings to Lake County, Florida from Bio-Clean, a Forterra Company, regarding Magnolia Lane Drainage, submitted Mar. 7, 2017, 8 pages.
(Continued)

*Primary Examiner* — Christopher Upton
(74) *Attorney, Agent, or Firm* — Brian S. Steinberger; Hilary F. Steinberger; Law Offices of Brian S. Steinberger, P.A.

(57) ABSTRACT

Systems, devices, and methods for providing nutrient removals in an up flow filtration storm water system for treating water to very high clean levels using filtration media. A filtration media can be supported by a screen above a floor in a vault allows for incoming storm water to pass into a void space above the floor into the screen and filtration media and then out an outlet to the vault. The filtration media can include recyclable and/or natural particles. Layers of river rocks can be placed on top of and below the filtration media. The captured debris can drop to the floor. The long lasting filtration media can be cleaned by being backwashed.

19 Claims, 14 Drawing Sheets

Related U.S. Application Data application No. 15/248,202, filed on Aug. 26, 2016, now Pat. No. 10,183,240, which is a continuation-in-part of application No. 14/288,455, filed on May 28, 2014, now abandoned.

(60) Provisional application No. 61/828,958, filed on May 30, 2013.

(51) Int. Cl.

| | | |
|---|---|---|
| *B01D 24/00* | (2006.01) | |
| *B01D 21/24* | (2006.01) | |
| *E03F 5/10* | (2006.01) | |
| *E03F 5/04* | (2006.01) | |
| *B01D 24/16* | (2006.01) | |
| *B01D 24/36* | (2006.01) | |
| *B01D 24/46* | (2006.01) | |

(52) U.S. Cl.
CPC ......... *B01D 24/007* (2013.01); *B01D 24/165* (2013.01); *B01D 24/36* (2013.01); *B01D 24/4631* (2013.01); *E03F 5/0403* (2013.01); *E03F 5/0404* (2013.01); *E03F 5/108* (2013.01); *E03F 5/14* (2013.01); *B01D 2101/04* (2013.01)

(58) Field of Classification Search
USPC ........ 210/162, 170.03, 265, 289, 293, 747.3
See application file for complete search history.

(56) References Cited

U.S. PATENT DOCUMENTS

| | | |
|---|---|---|
| 587,559 A | 8/1897 | Riley |
| 664,945 A | 1/1901 | Guion |
| 783,556 A | 2/1905 | Van Buskirk |
| 809,201 A | 1/1906 | Lutz |
| 838,129 A | 12/1906 | Mikolasek |
| 920,961 A | 5/1909 | Keil |
| 1,060,338 A | 4/1913 | Gschwind |
| 1,442,348 A | 1/1923 | McDermet |
| 2,102,310 A | 12/1937 | Egan |
| 2,182,795 A | 12/1939 | Day |
| 2,263,259 A | 11/1941 | Boosey |
| 2,360,961 A | 10/1944 | Mayo |
| 2,436,793 A | 3/1948 | Danel |
| 2,485,755 A | 10/1949 | Loosli |
| 2,559,784 A | 7/1951 | Moore |
| 2,615,526 A | 10/1952 | Lane |
| 2,652,946 A | 9/1953 | Beatty |
| 2,796,988 A | 6/1957 | Loffler |
| 3,091,339 A | 5/1963 | Marra |
| 3,237,915 A | 3/1966 | Palmer |
| 3,237,975 A | 3/1966 | Stahley |
| 3,282,430 A | 11/1966 | Kinne |
| 3,527,348 A | 9/1970 | Henri |
| 3,631,983 A | 1/1972 | Mail |
| 4,024,881 A | 5/1977 | Weiland et al. |
| 4,070,863 A | 1/1978 | Brown |
| 4,189,386 A | 2/1980 | Aman |
| 4,198,717 A | 4/1980 | Kessel |
| 4,278,190 A | 7/1981 | Oory et al. |
| 4,297,219 A | 10/1981 | Kirk et al. |
| 4,308,141 A | 12/1981 | Clendenen |
| 4,326,952 A | 4/1982 | Blake |
| 4,422,931 A | 12/1983 | Wolde-Michael |
| 4,509,717 A | 4/1985 | Wright et al. |
| 4,668,405 A | 5/1987 | Boze |
| 4,689,145 A | 8/1987 | Mathews et al. |
| 4,722,800 A | 2/1988 | Aymong |
| 4,738,644 A | 4/1988 | Happel |
| 4,765,889 A | 8/1988 | Grujanac |
| 4,785,966 A | 11/1988 | Waltke |
| 4,891,128 A | 1/1990 | Goronszy |
| 4,895,653 A | 1/1990 | Cherochak |
| 5,034,122 A | 7/1991 | Wiesemann |
| 5,037,541 A | 8/1991 | Ruey-Jang et al. |
| 5,069,781 A | 12/1991 | Wilkes |
| 5,133,619 A | 7/1992 | Murfae et al. |
| 5,232,587 A | 8/1993 | Hegemier et al. |
| 5,284,580 A | 2/1994 | Shyh |
| 5,372,714 A | 12/1994 | Logue, Jr. |
| 5,378,376 A | 1/1995 | Zenner |
| 5,397,464 A | 3/1995 | Hannon |
| 5,403,474 A | 4/1995 | Emery |
| 5,405,539 A | 4/1995 | Schneider |
| 5,480,254 A | 1/1996 | Autry et al. |
| 5,486,287 A | 1/1996 | Murphy et al. |
| 5,518,024 A | 5/1996 | Weeks et al. |
| 5,535,554 A | 7/1996 | Harris, Jr. |
| 5,562,819 A | 10/1996 | Turner, Jr. et al. |
| 5,575,925 A | 11/1996 | Logue, Jr. |
| 5,632,889 A | 5/1997 | Tharp |
| 5,643,445 A | 7/1997 | Billias et al. |
| 5,670,039 A | 9/1997 | Harris |
| 5,779,888 A | 7/1998 | Bennett |
| 5,810,510 A | 9/1998 | Urriola |
| 5,820,762 A | 10/1998 | Bamer et al. |
| 5,855,774 A | 1/1999 | Boelter |
| 5,904,842 A | 5/1999 | Billias et al. |
| 5,980,740 A | 11/1999 | Harms et al. |
| 5,985,157 A | 11/1999 | Leckner et al. |
| 6,032,421 A | 3/2000 | Yamada |
| 6,077,448 A | 6/2000 | Tran-Quoc-Nam et al. |
| 6,086,756 A | 7/2000 | Roy |
| 6,086,758 A | 7/2000 | Schilling et al. |
| 6,099,743 A | 8/2000 | Pedersen |
| 6,106,706 A | 8/2000 | Roy et al. |
| 6,106,707 A | 8/2000 | Morris et al. |
| 6,149,803 A | 11/2000 | DiLoreto, Jr. et al. |
| 6,178,565 B1 | 1/2001 | Franco |
| 6,190,545 B1 | 2/2001 | Williamson |
| 6,200,484 B1 | 3/2001 | McInnis |
| 6,231,758 B1 | 5/2001 | Morris et al. |
| 6,270,663 B1 | 8/2001 | Happel |
| 6,287,459 B1 | 9/2001 | Williamson |
| 6,294,095 B1 | 9/2001 | Lewis |
| 6,315,897 B1 | 11/2001 | Maxwell |
| 6,334,953 B1 | 1/2002 | Singleton |
| 6,379,541 B1 | 4/2002 | Nicholas |
| 6,428,692 B2 | 8/2002 | Happel |
| 6,478,954 B1 | 11/2002 | Turner, Jr. et al. |
| 6,517,709 B1 | 2/2003 | Cardwell et al. |
| 6,531,059 B1 | 3/2003 | Morris et al. |
| 6,537,446 B1 | 3/2003 | Sanguinetti |
| 6,551,023 B2 | 4/2003 | Allard |
| 6,562,233 B1 | 5/2003 | Schilling et al. |
| 6,638,424 B2 | 10/2003 | Stever et al. |
| 6,651,825 B2 | 11/2003 | Turner, Jr. et al. |
| 6,666,974 B2 | 12/2003 | Page |
| 6,668,390 B1 | 12/2003 | Gonzalez |
| 6,733,665 B1 | 5/2004 | Khalil |
| 6,767,456 B2 | 7/2004 | Middleton et al. |
| 6,780,310 B1 | 8/2004 | Howe |
| 6,797,161 B2 | 9/2004 | Use et al. |
| 6,797,162 B2 | 9/2004 | Happel |
| 6,800,195 B1 | 10/2004 | Batten et al. |
| 6,824,677 B2 | 11/2004 | Martinez |
| 6,866,153 B2 | 3/2005 | Turner, Jr. et al. |
| 6,869,525 B1 | 3/2005 | Happel |
| 6,872,029 B2 | 3/2005 | Allard et al. |
| 6,884,343 B2 | 4/2005 | Harris et al. |
| 6,936,163 B2 | 8/2005 | Use et al. |
| 6,939,461 B2 | 9/2005 | Use et al. |
| 6,951,607 B2 | 10/2005 | Use et al. |
| 6,974,540 B1 | 12/2005 | Fleischmann |
| 6,976,808 B2 | 12/2005 | Allard |
| 6,979,148 B2 | 12/2005 | Happel et al. |
| 6,986,621 B2 | 1/2006 | Allard |
| 6,994,783 B2 | 2/2006 | Use et al. |
| 6,998,039 B2 | 2/2006 | Harris et al. |
| 7,005,060 B2 | 2/2006 | Pitt et al. |
| 7,011,743 B2 | 3/2006 | Use et al. |

(56) References Cited

U.S. PATENT DOCUMENTS

| | | |
|---|---|---|
| 7,083,721 B2 | 8/2006 | McClure et al. |
| 7,094,337 B2 | 8/2006 | Williams et al. |
| 7,094,338 B2 | 8/2006 | Morris et al. |
| 7,112,274 B1 | 9/2006 | Sanguinetti |
| 7,128,341 B1 | 10/2006 | Dahl et al. |
| 7,128,832 B2 | 10/2006 | Wade |
| 7,132,045 B1 | 11/2006 | Trangsrud |
| 7,153,417 B2 | 12/2006 | Happel |
| 7,156,987 B1 | 1/2007 | Sanguinetti |
| 7,270,747 B2 | 9/2007 | Happel et al. |
| 7,282,142 B2 | 10/2007 | Kraft |
| 7,288,188 B2 | 10/2007 | Al-Assfour |
| 7,294,256 B2 | 11/2007 | Happel et al. |
| 7,309,420 B1 | 12/2007 | Trangsrud |
| 7,328,809 B2 | 2/2008 | Gigas et al. |
| 7,396,471 B2 | 7/2008 | Wimberger |
| 7,488,414 B2 | 2/2009 | Wimberger |
| 7,494,585 B2 | 2/2009 | Nino |
| 7,524,414 B1 | 4/2009 | Barragan |
| 7,658,857 B2 | 2/2010 | Wacome |
| 7,662,280 B1 | 2/2010 | Cooney |
| 7,722,763 B2 | 5/2010 | Benty et al. |
| 7,771,591 B2 | 8/2010 | Lucas |
| 7,785,464 B2 | 8/2010 | Happel |
| 7,815,800 B2 | 10/2010 | Komatsu |
| 7,824,551 B2 | 11/2010 | Wanielista et al. |
| 7,846,327 B2 | 12/2010 | Happel et al. |
| 7,883,620 B2 | 2/2011 | Owen |
| 7,897,047 B2 | 3/2011 | Wanielista et al. |
| 7,927,484 B2 | 4/2011 | Wanielista et al. |
| 7,955,507 B2 | 6/2011 | Wanielista et al. |
| 7,959,799 B2 | 6/2011 | Happel et al. |
| 7,981,283 B2 | 7/2011 | Happel et al. |
| 7,981,300 B2 | 7/2011 | Wacome |
| 8,002,984 B1 | 8/2011 | Wanielista et al. |
| 8,002,985 B1 | 8/2011 | Wanielista et al. |
| 8,017,006 B2 | 9/2011 | Lopez |
| 8,034,234 B2 | 10/2011 | Happel |
| 8,034,236 B1 | 10/2011 | Happel |
| 8,034,237 B2 | 10/2011 | Happel et al. |
| 8,038,879 B2 | 10/2011 | Kraft |
| 8,051,568 B2 | 11/2011 | Moody et al. |
| 8,083,937 B2 | 12/2011 | Happel |
| 8,101,079 B1 | 1/2012 | Wanielista et al. |
| 8,142,666 B2 | 3/2012 | Happel |
| 8,153,005 B1 | 4/2012 | Wanielista et al. |
| 8,216,453 B2 | 7/2012 | Moody et al. |
| 8,221,632 B2 | 7/2012 | McInnis et al. |
| 8,231,780 B2 | 7/2012 | Happel |
| 8,252,182 B1 | 8/2012 | Chang et al. |
| 8,366,923 B1 | 2/2013 | Happel |
| 8,393,827 B1 | 3/2013 | Happel |
| 8,425,150 B1 | 4/2013 | Happel |
| 8,491,797 B1 | 7/2013 | Happel |
| 8,622,652 B1 | 1/2014 | Happel |
| 8,651,767 B1 | 2/2014 | Happel |
| 8,658,044 B2 | 2/2014 | Cobb |
| 8,974,144 B1 | 3/2015 | Happel |
| 9,068,312 B1 | 6/2015 | Happel |
| 9,340,965 B2 | 5/2016 | Happel |
| 9,534,368 B1 | 1/2017 | Happel |
| 10,155,670 B1 | 12/2018 | Happel |
| 10,183,240 B1 | 1/2019 | Happel |
| 10,202,285 B1 | 2/2019 | Happel |
| 10,238,993 B1 | 3/2019 | Happel |
| 10,260,222 B1 | 4/2019 | Happel |
| 10,287,768 B1 | 5/2019 | Happel |
| 10,384,956 B1 | 8/2019 | Happel |
| 10,472,815 B1 | 11/2019 | Happel |
| 2001/0047954 A1 | 12/2001 | Happel |
| 2003/0026659 A1 | 2/2003 | Wu |
| 2003/0089652 A1 | 5/2003 | Matsui et al. |
| 2003/0121846 A1 | 7/2003 | Use et al. |
| 2003/0132150 A1 | 7/2003 | Happel |
| 2003/0136717 A1 | 7/2003 | Tseng |
| 2003/0172487 A1 | 9/2003 | Thompson et al. |
| 2003/0175079 A1 | 9/2003 | Happel et al. |
| 2004/0065601 A1 | 4/2004 | Martinez |
| 2004/0222159 A1 | 11/2004 | Peters et al. |
| 2004/0226869 A1 | 11/2004 | McClure et al. |
| 2005/0051499 A1 | 3/2005 | Nino |
| 2005/0069386 A1 | 3/2005 | Happel et al. |
| 2005/0183997 A1 | 8/2005 | Happel et al. |
| 2005/0218049 A1 | 10/2005 | Happel |
| 2006/0016767 A1 | 1/2006 | Olson et al. |
| 2006/0096935 A1 | 5/2006 | Harding |
| 2006/0163130 A1 | 7/2006 | Happel et al. |
| 2006/0201860 A1 | 9/2006 | Happel et al. |
| 2006/0207922 A1 | 9/2006 | Dussich |
| 2009/0045135 A1 | 2/2009 | Khudenko et al. |
| 2009/0114579 A1 | 5/2009 | Dyer |
| 2009/0134081 A1 | 5/2009 | Happel et al. |
| 2009/0166279 A1 | 7/2009 | Happel et al. |
| 2010/0032363 A1 | 2/2010 | Happel |
| 2010/0078370 A1 | 4/2010 | Happel |
| 2011/0168612 A1 | 7/2011 | Happel |
| 2011/0278237 A1 | 11/2011 | McInnis |
| 2014/0352729 A1 | 12/2014 | Happel |
| 2015/0129473 A1 | 5/2015 | Kent |
| 2019/0078310 A1 | 3/2019 | Kent |

OTHER PUBLICATIONS

Bio-Clean, Final Project Drawings approved by Lake County, Florida from Bio-Clean, a Forterra Company, regarding Magnolia Lane Drainage, Mar. 23, 2017, 1 page.

Rising and Non-Rising Stem, Telescoping Valves, Halliday Products, retrieved on Jun. 15, 2009, retrieved from www.hallidayproducts.com/ssg.html, 4 pages.

Aluminum Slide and Weir Glass, Water, and Waste Water Valves and Gates, retrieved on Jun. 15, 2009, retrieved from http://ncvg.net/products/alumslideweir.html, 10 pages.

Happel, T., Utility U.S. Appl. No. 14/151,284, filed Jan. 9, 2014; Office Action Summary dated Dec. 24, 2014, 12 pages.

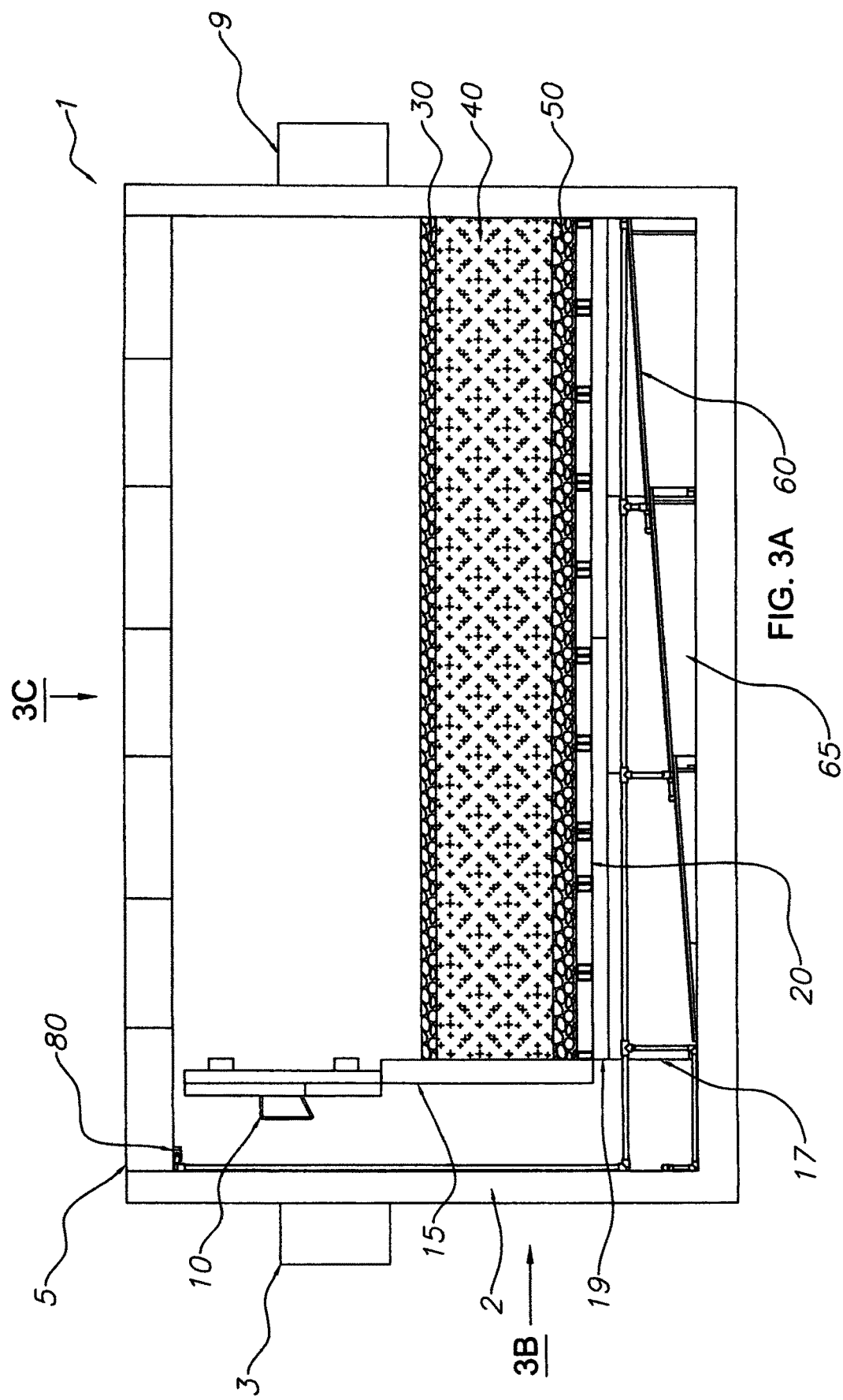

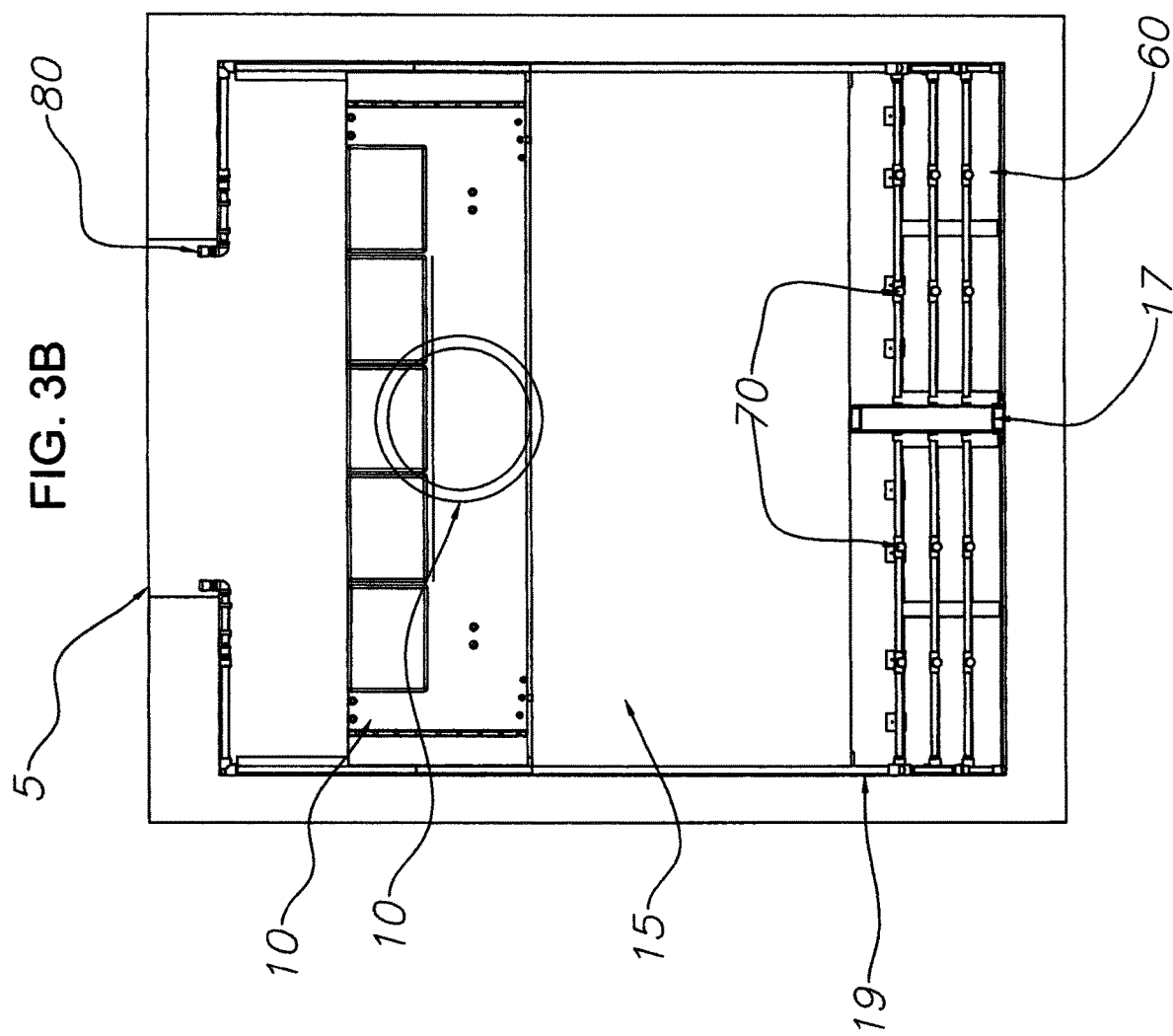

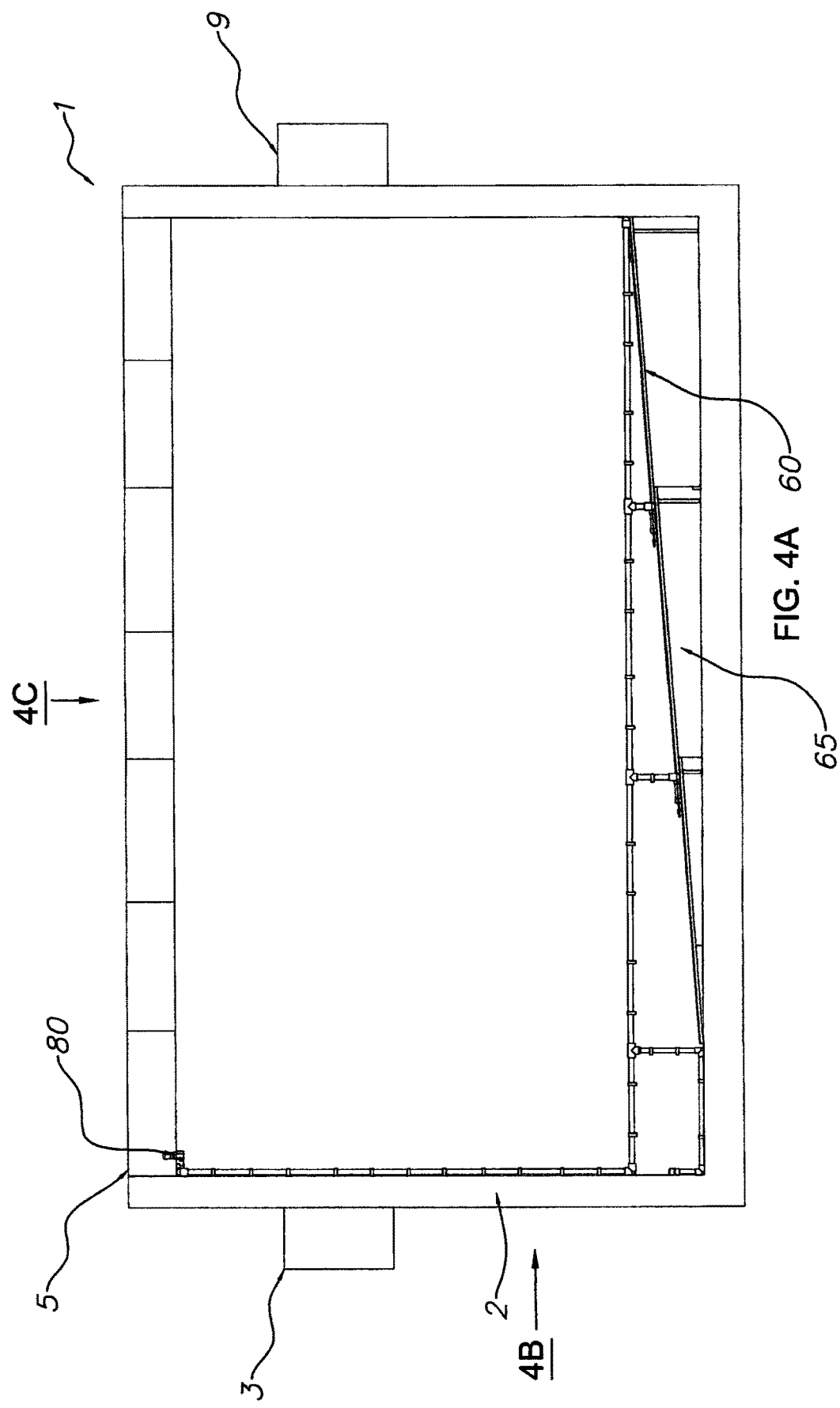

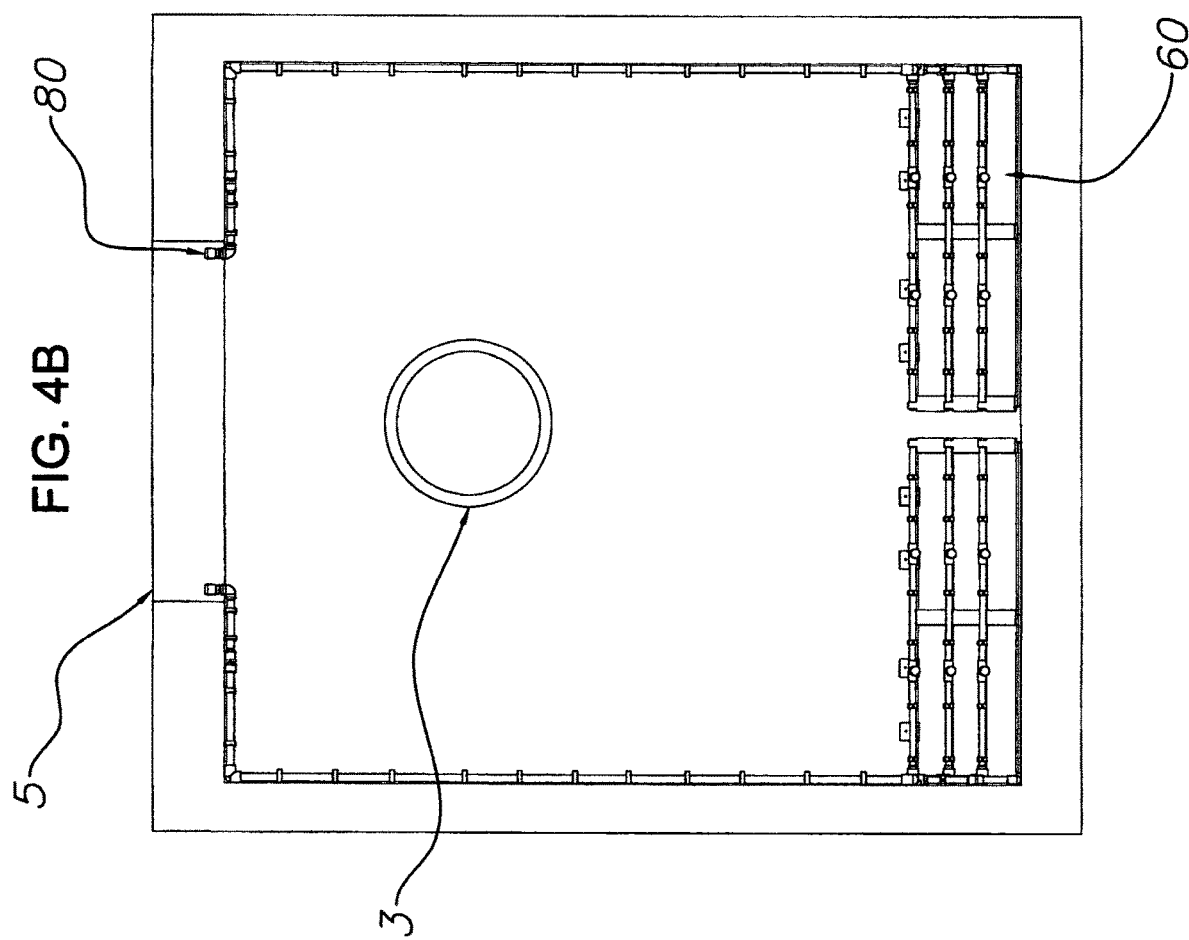

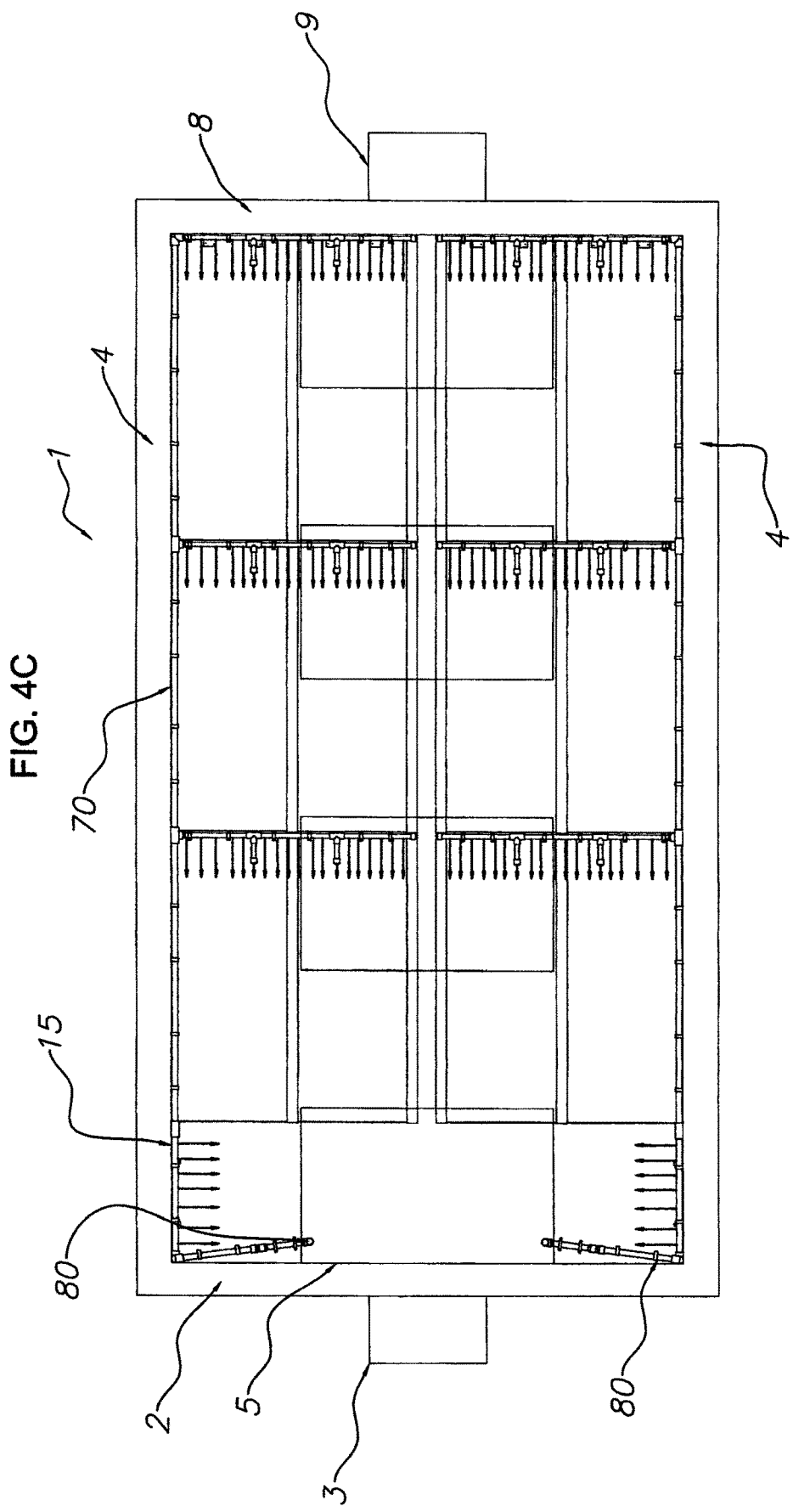

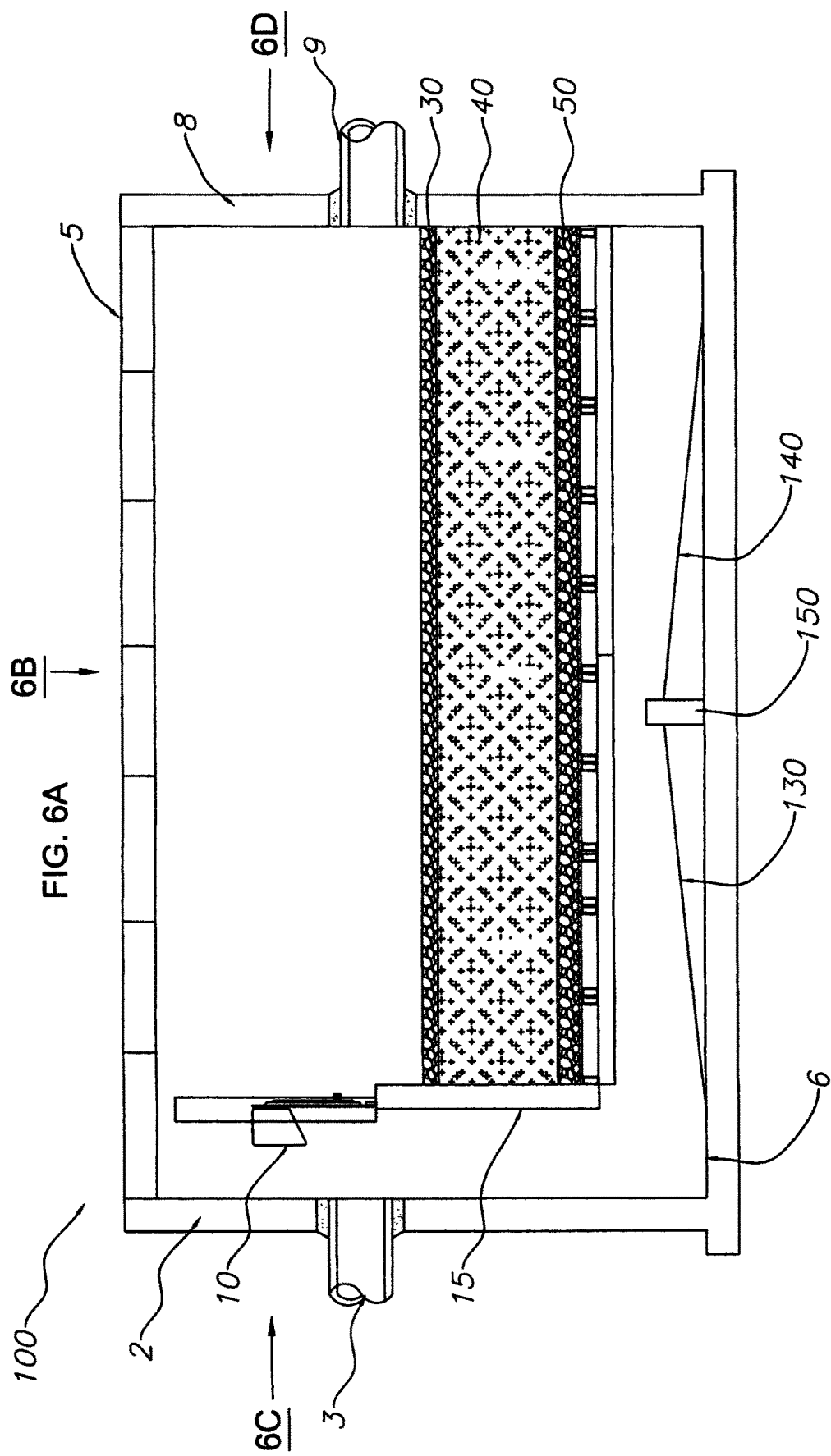

NUTRIENT REMOVAL FILTRATION SYSTEM AND METHOD

CROSS REFERENCE TO RELATED APPLICATIONS

This application is a Divisional of U.S. patent application Ser. No. 15/952,803 filed Apr. 13, 2018, which is a Divisional of U.S. patent application Ser. No. 15/248,202 filed Aug. 26, 2016, now U.S. Pat. No. 10,183,240, which is a Continuation-In-Part of U.S. patent application Ser. No. 14/288,455 filed May 28, 2014, abandoned, which claims the benefit of priority to U.S. Provisional Patent Application Ser. No. 61/828,958 filed May 30, 2013. The entire disclosure of each of the applications listed in this paragraph are incorporated herein by specific reference thereto.

FIELD OF INVENTION

This invention relates to storm water treatment, and in particular to systems, devices, and methods for providing nutrient removals in an up flow filtration storm water system for treating water to high clean levels using filtration media and a screen, where captured debris slide down a sloped floor to a low point where the debris can be liquefied by water sprayers followed by being easily vacuum removed.

BACKGROUND AND PRIOR ART

Federal clean water requirements require water bodies such as lakes and rivers that must meet strict minimal water quality specifications. To achieve these requirements, storm water drainage pipes often require treatment before conveying storm water into receiving water bodies. As a result, a wide variety of technologies have been developed to treat storm water and improve the water quality.

Common storm water treatment systems are hydrodynamic separators such as baffle type boxes and vortex systems. Hydrodynamic separators can treat relatively large water flows and are good for removing solids that are relatively large in size. However, these types of systems are limited to the size of the pollutants being removed, and are not very efficient for removing dissolved pollutants such as dissolved phosphorus and nitrogen, etc.

To achieve water treatment beyond what can be accomplished by a hydrodynamic separator, another class of storm water treatment systems commonly referred to as filtration systems are used. Filtration systems typically will pass the water flow through a filter media such as sand, zeolite, activated carbon, and the like. Filter media is typically selected to do more than remove solids from the water flow. Depending on the pollutants of concern, filter media can be selected to remove specific dissolved pollutants such as nutrients, metals, or a wide variety of chemical contaminates.

However, a problem with using filter media in a storm water treatment system is the significant influence of friction between the water and the media. In addition, changing the direction of water flow as it passes through a filtration system reduces the kinetic energy of the water flow which will reduce the volume water flow. During big rain events a storm water filtration system in a storm water pipe can significantly inhibit the passage of water and cause flooding upstream from the filtration system. If the filtration system becomes clogged with debris the water flow can be completely stopped.

Typical filter media treatment has required the use of cartridge systems. See for example, U.S. Pat. No. 8,658,044 to Cobb, assigned to Contech Engineered Solutions LLC, and U.S. Published Patent Application 2015/0129473 to Kent. Generally in these types of systems, multiple individual cartridges are filled with media. Water flow is then passed through each of the cartridges and the cartridges collectively treat the water flow. The problem is that the size of the cartridges are limited to a size that can be removed from the vault during servicing. Additionally, there are void spaces between the cartridges, and these spaces are not able to be engaged in the treatment process.

The inventor of the subject application has used media in filters inside of storm water vaults. See for example, U.S. Pat. Nos. 8,034,234 and 8,231,780 to Happel, which are both incorporated by reference. In these patents filtration media cartridges are not being used. However, these patents and all the prior art have additional problems of what happens to the debris which will land spread out across the entire floor of the vault. Having to service debris that is located everywhere on the floor makes it difficult and time consuming to later remove that debris. For example, vacuum lines would need to be used throughout the entire floor. Additionally, the debris can remain in large sizes.

Thus, the need exists for solutions to the above problems with the prior art.

SUMMARY OF THE INVENTION

A primary objective of the present invention is to provide systems, devices, and methods for providing nutrient removals in an up flow filtration storm water system for treating water to high clean levels using filtration media and a screen, where captured debris slide down a sloped floor to a low point where the debris can be liquefied by water sprayers followed by being easily vacuum removed.

A secondary objective of the present invention is to provide systems, devices, and methods for providing nutrient removals in an up flow filtration storm water system for treating water to very high clean levels with filtration media, that can remove pollutants, such as nutrients, oils, phosphorus and nitrogen, where the filter media only needs to be back flushed during servicing and not removed as is required with cartridge filters.

A third objective of the present invention is to provide systems, devices, and methods for providing nutrient removals in an up flow filtration storm water system for treating water to very high clean levels with filtration media, that can remove pollutants, such as nutrients, oils, phosphorus and nitrogen, where the filter media servicing requires less labor, time and media replacement costs as compared to cartridge filters.

A fourth objective of the present invention is to provide systems, devices, and methods for providing nutrient removals in an up flow filtration storm water system for treating water to very high clean levels using filtration media, that can remove pollutants, such as nutrients, oils, phosphorus and nitrogen, where space under the filtration media can be serviced without having to send a technician into the vault saving time and labor.

A fifth objective of the present invention is to provide systems, devices, and methods for providing nutrient removals in an up flow filtration storm water system for treating water to very high clean levels using filtration media, that can accommodate different media types, and be easy to replace and changed out forming a train.

A sixth objective of the present invention is to provide systems, devices, and methods for providing nutrient removals in an up flow filtration storm water system for treating water to very high clean levels using filtration media, with hydrology that varies depending of flow rate.

A seventh objective of the present invention is to provide systems, devices, and methods for providing nutrient removals in an up flow filtration storm water system for treating water to very high clean levels using filtration media, that can be placed in line with existing pipes.

An eighth objective of the present invention is to provide systems, devices, and methods for providing nutrient removals in an up flow filtration storm water system for treating water to very high clean levels using a fluidized media bed that resists clogging.

A ninth objective of the present invention is to provide systems, devices, and methods for providing nutrient removals in an up-flow filtration storm water system for treating water to very high clean levels using filtration media, with easy to remove sediments falling into a settling chamber below media.

A tenth objective of the present invention is to provide systems, devices, and methods for providing nutrient removals in an up flow filtration storm water system for treating water to very high clean levels using filtration media, that can be added to existing treatment systems to improve removal efficiencies of baffle boxes, detention ponds, and spinner systems.

An eleventh objective of the present invention is to provide systems, devices, and methods for providing nutrient removals in an up-flow filtration storm water system for treating water to very high clean levels using filtration media, that is able to pass larger flows.

The novel filtration system can be used for removing a wide array of pollutants, including but not limited to the dissolved phosphorus, dissolved nitrogen, total suspended solids (TSS), nutrients, metals, bacteria, and oil.

A nutrient removal filtration system, can include a generally horizontal screen supported above a bottom of an in-flow vault, with a void space formed between the bottom and the screen, a filtration media resting on the screen, wherein storm water flowing into the vault through an inlet passes into the void space and up through the screen and filtration media and out the vault through an outlet, so that contaminants, metals, nutrients and solids are removed from the storm water by the filtration system, and a sloped floor on the bottom with a lower end adjacent to the inlet and a higher end adjacent to the outlet so that sediment and debris dropping from the filtration media lands on the sloped floor and slides downward toward the lower end of the sloped floor.

The nutrient removal filtration system can include a sprayer for directing water toward the lower end of the sloped floor to liquefy the debris.

The nutrient removal filtration system can include a source of high pressure water from outside the vault, and at least one for running the water to the sprayer.

The nutrient removal filtration system can include a vacuum for removing the liquefied debris from the lower end of the floor.

The filtration media can be selected from at least one of loose recyclable particles and loose natural particles.

The nutrient removal filtration system can include a first layer selected from at least one of loose rocks above the filtration media, and a screen on top of the filtration media, and a second layer of loose rocks between the filtration media and the screen.

The nutrient removal filtration system can include a baffle wall fixed to a front end of the filtration media supported on the screen, so that the baffle wall direct inlet water to flow to the void space under the screen.

The nutrient removal filtration system can include a floating skimmer movably attached to the baffle wall adjacent to the inlet to the vault.

A nutrient removal filtration system, can include a generally horizontal screen supported above a bottom of a treatment vault, with a void space formed between the bottom and the screen, a filtration media resting on the screen, wherein storm water flowing into the vault through an inlet passes into the void space and up through the screen and filtration media and out the vault through an outlet, so that contaminants, metals, nutrients and solids are removed from the storm water by the filtration system, a first side sloped floor on the bottom of the vault with an upper end adjacent to one side of the vault and a lower end adjacent to a middle portion of the vault, and a second side sloped floor on the bottom of the vault with an upper end adjacent to another side of the vault and a lower end adjacent to the middle portion of the vault, wherein sediment and debris from the screen and media falls and slides downward toward the lower end of the first sloped floor, and slides downward toward the lower end of the second sloped floor.

The nutrient removal filtration system can include a sprayer system for directing water, contaminants, metals, nutrients and solids toward the lower end of the first sloped floor and the lower end of the second sloped floor, and to move the debris toward a vacuum line in the vault.

The nutrient removal filtration system can include a source of high pressure water from outside the vault and lines for running the water to the sprayer.

The nutrient removal filtration system can include a left slope in the floor having a lower end adjacent to a left end of the vault and a high end adjacent to a middle of the vault, and a right slope in the floor having a lower end adjacent to a right end of the vault and a high end adjacent to the middle of the vault, The filtration media can be selected from at least one of loose recyclable particles and loose natural particles.

The nutrient removal filtration system can include a first layer selected from at least one of loose rocks above the filtration media, and a screen on top of the filtration media, and a second layer of loose rocks between the filtration media and the screen.

The nutrient removal filtration system can include a baffle wall fixed to a front end of the filtration media supported on the screen, so that the baffle wall direct inlet water to flow to the void space under the screen.

The nutrient removal filtration system can include a floating skimmer movably attached to the baffle wall adjacent to the inlet.

A method of removing from a storm water vault, can include the steps of providing a generally horizontal screen supported above a floor of an in-flow vault, with a void space formed between the floor and the screen, providing a filtration media resting on the screen, providing the floor with at least one slope and with at least one high end and at least one lower end, directing storm water flowing into the vault through the inlet to pass into the void space and up through the screen and filtration media and out the vault through an outlet, directing debris from the screen and filtration media to slide down the at least one slope on the floor to the at least one lower end, and removing the debris from the at least one lower end of the at least one slope on the floor.

The at least one slope in the floor can include the lower end adjacent to the inlet and the higher end adjacent to the outlet so that sediment and debris dropping from the filtration media lands on the sloped floor and slides downward toward the lower end of the sloped floor.

The at least one sloped floor can include a first side sloped floor on the bottom of the vault with an upper end adjacent to one side of the vault and a lower end adjacent to a middle portion of the vault, a second side sloped floor on the bottom of the vault with an upper end adjacent to another side of the vault and a lower end adjacent to the middle portion of the vault, a left sloped floor having a low end adjacent to the inlet to the vault and a high end adjacent to a center of the vault, and a right sloped floor having a low end adjacent to the outlet to the vault and a high end adjacent to the center of the vault, so that sediment and debris from the screen and media falls and slides downward toward the lower end of the first side sloped floor and downward to the lower end of the left sloped floor, and the sediment and debris from the screen and media falls and slides downward toward the lower end of the second sloped floor and downward to the lower end of the right sloped floor.

The method can include the steps of liquefying the debris with a sprayer, and vacuuming the liquefied debris from the vault.

Further objects and advantages of this invention will be apparent from the following detailed description of the presently preferred embodiments which are illustrated schematically in the accompanying drawings.

BRIEF DESCRIPTION OF THE FIGURES

FIG. 3A if a front side view of the filtration system of FIG. 1A.

FIG. 3B is an inlet end view of the filtration system of FIG. 3A along arrow 3B.

FIG. 4A is another front side view of the filtration system of FIG. 1A showing the sloped floor without the floating skimmer, baffle wall, screen, filtration media and rock layers, FIG. 4B is an inlet end view of the filtration system of FIG. 4A along arrow 4B.

FIG. 4C is a top view of the filtration system of FIG. 4A along arrow 4C.

FIG. 6A is a front side view of a second embodiment of the nutrient removal filtration system with a first slope floor and second sloped floor.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1A:
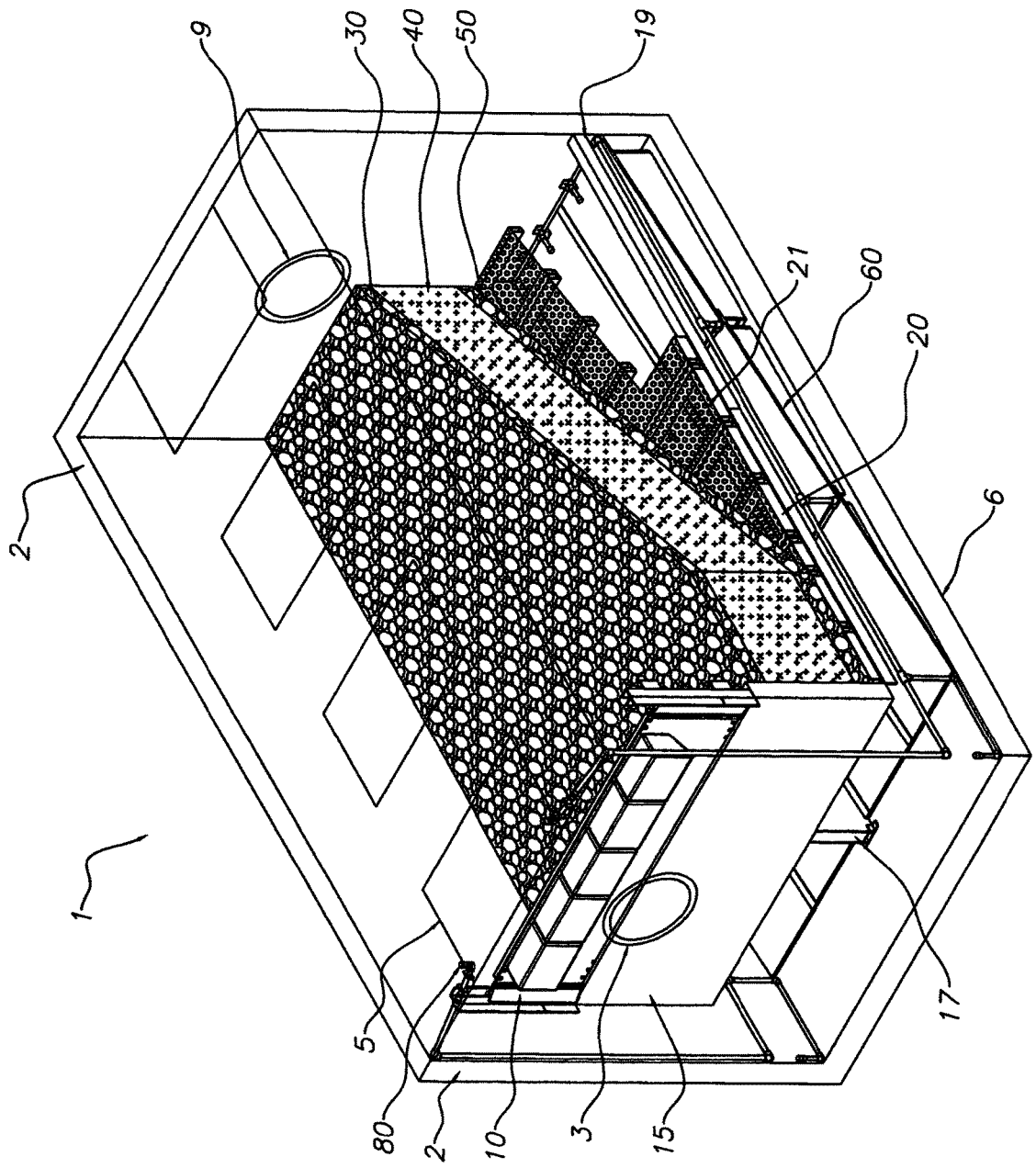
FIG. 1A is an upper front right perspective with partial front right cut-away view of the nutrient removing filtration system with floating skimmer and baffle wall.
Figure 1B:
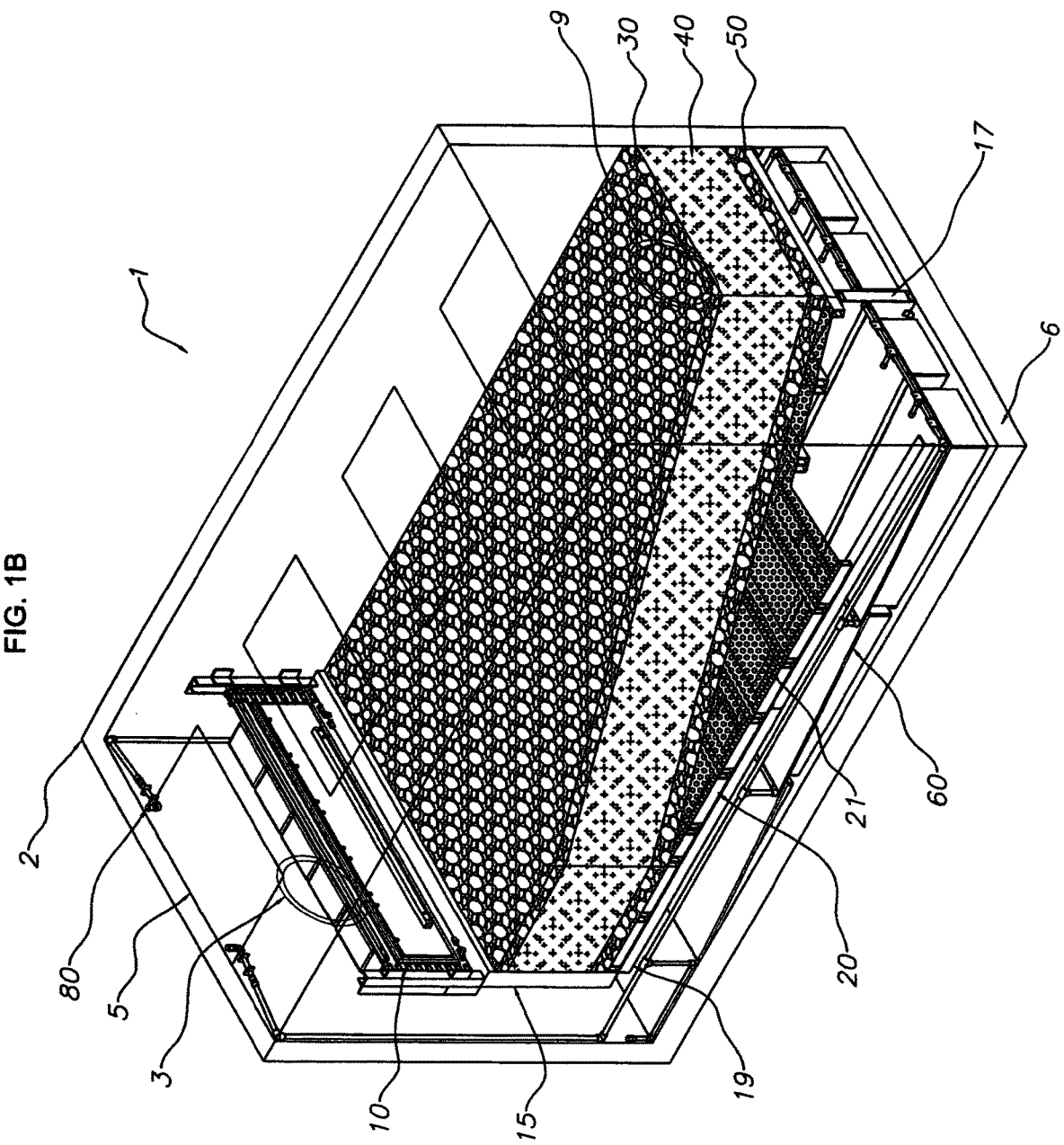
FIG. 1B is a front right perspective view of the filtration system of FIG. 1A.

A list of components will now be described.
1 first embodiment filtration removal system
2 vault front end
3 inlet/inflow pipe
4 vault sides
5 access hatches
6 vault floor
8 vault rear end
9 outlet/outflow pipe
10 floating skimmer
15 baffle wall
17 baffle support
19 support angle
20 screen panel
30 first rock layer or screen
35 limestone layer
40 filtration media
50 second rock layer
55 limestone layer
60 sloped floor
65 slope support(s) for sloped floor
70 sprayers
80 water lines
100 second embodiment filtration removal system
110 first side sloped floor
120 second side sloped floor
130 left sloped floor
140 right sloped floor
150 middle baffle FIG. 1A is an upper front right perspective with partial front right cut-away view of the nutrient removing filtration system 1 with floating skimmer 10 and baffle wall 15. FIG.

Figure 2A:
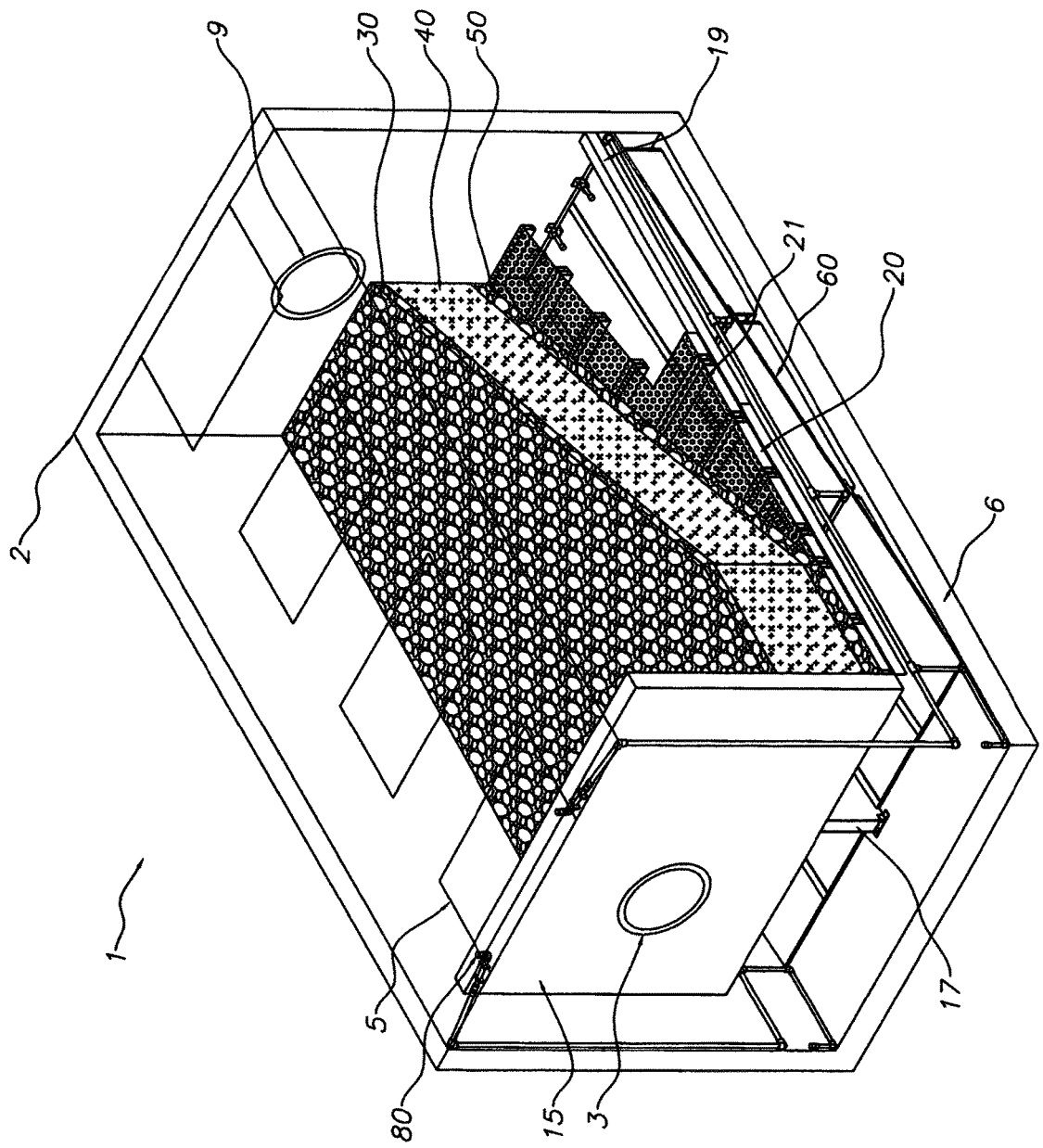
FIG. 2A is another upper front right perspective view of the filtration system of FIG. 1A without the floating skimmer.
Figure 2B:
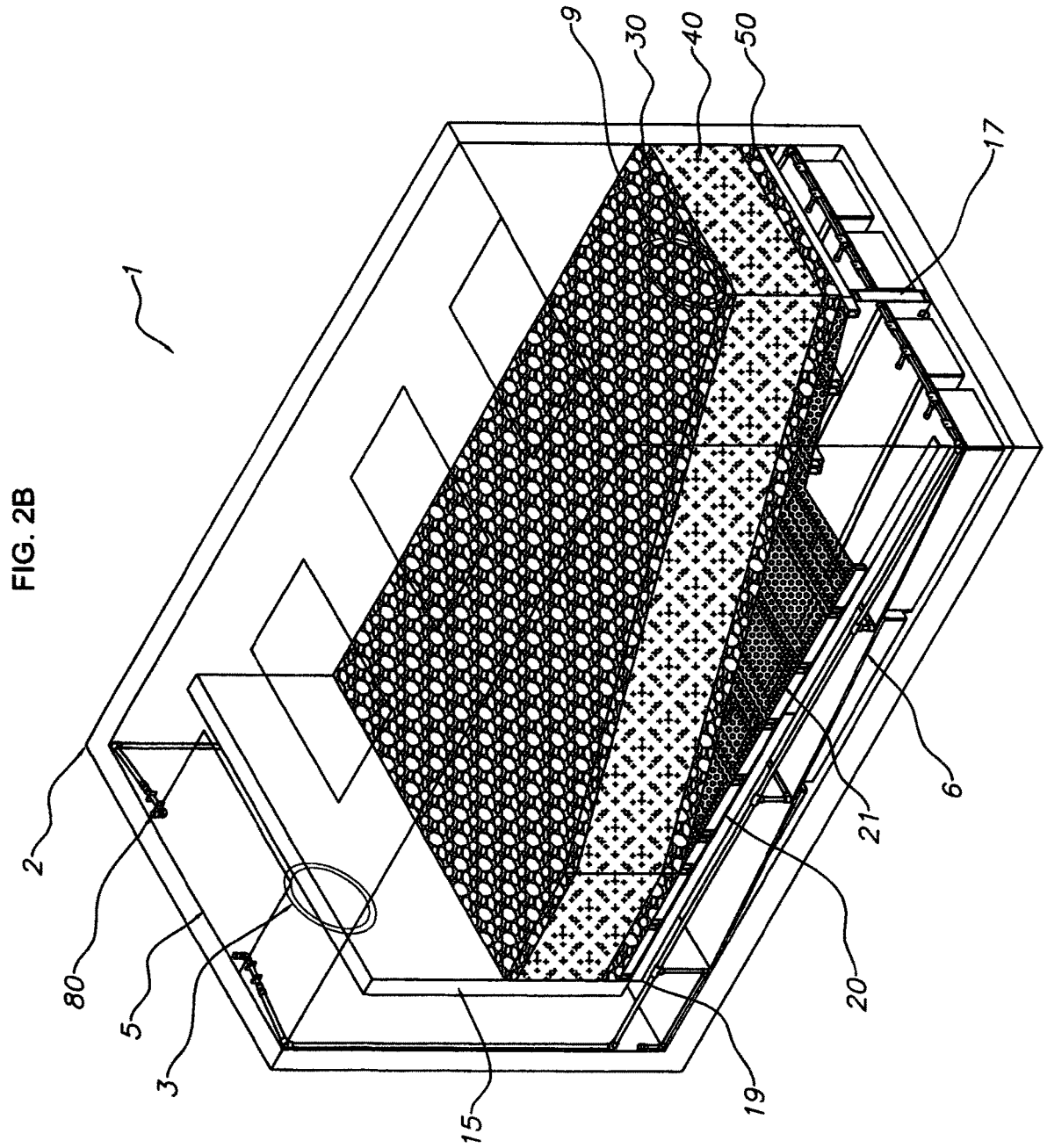
FIG. 2B is a front right perspective view of the filtration system of FIG. 2A.

1B is a front right perspective view of the filtration system 1 of FIG. 1A. FIG. 2A is another upper front right perspective view of the filtration system 1 of FIG. 1A without the floating skimmer 10. FIG. 2B is a front right perspective view of the filtration system 1 of FIG. 2A.

Figure 3C:
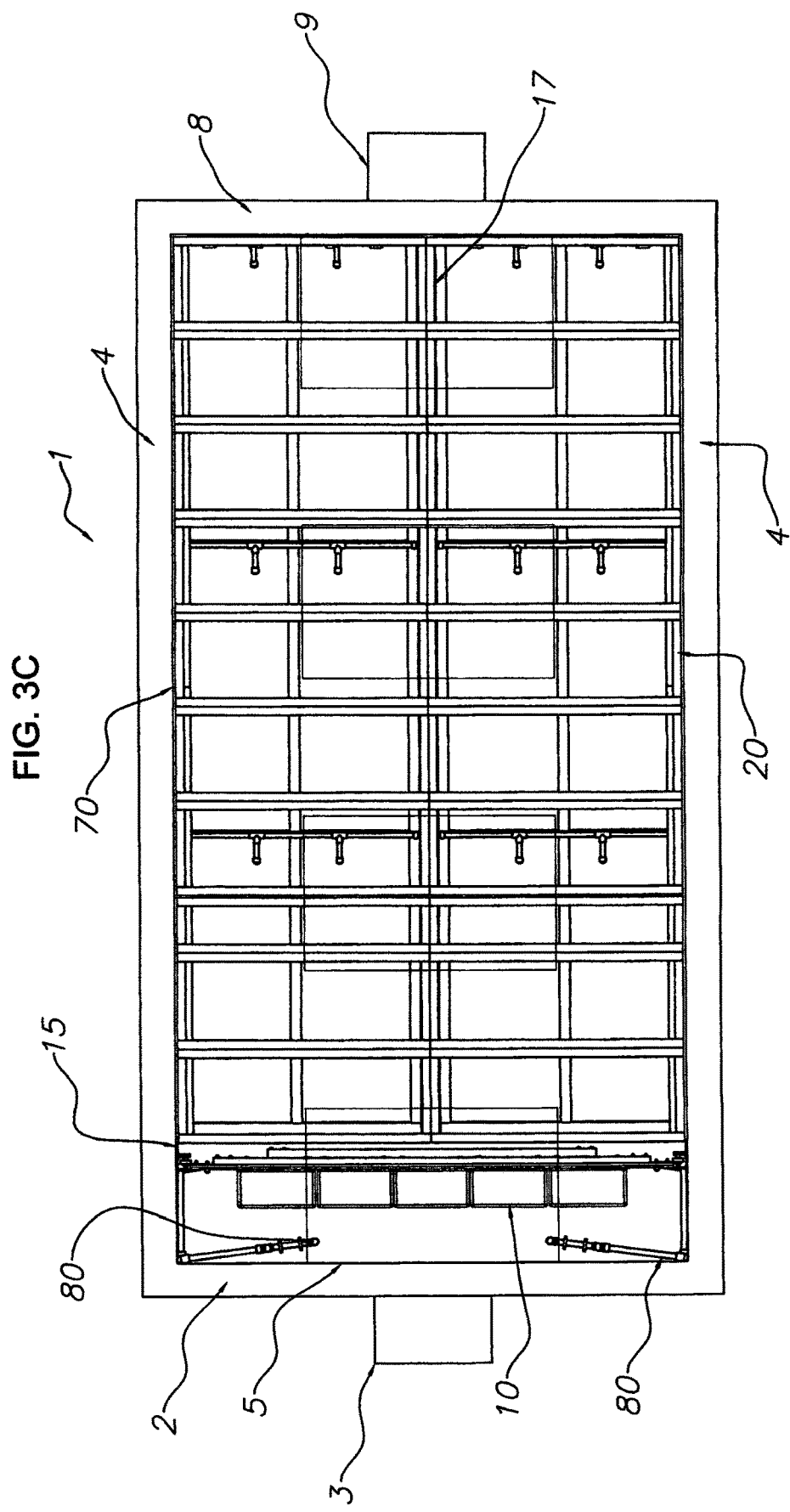
FIG. 3C is a bottom view of the filtration system of FIG. 3A along arrow 3C.

FIG. 3A if a front side view of the filtration system 1 of FIG. 1A. FIG. 3B is an inlet end view of the filtration system 1 of FIG. 3A along arrow 3B. FIG. 3C is a bottom view of the filtration system 1 of FIG. 3A along arrow 3C.

FIG. 4A is another front side view of the filtration system 1 of FIG. 1A showing the sloped floor 60 without the floating skimmer 10, baffle wall 15, screen panel 20, filtration media 40 and rock layers 30, 50, FIG. 4B is an inlet end view of the filtration system 1 of FIG. 4A along arrow 4B. FIG. 4C is a top view of the filtration system 1 of FIG. 4A along arrow 4C.

Figure 5:
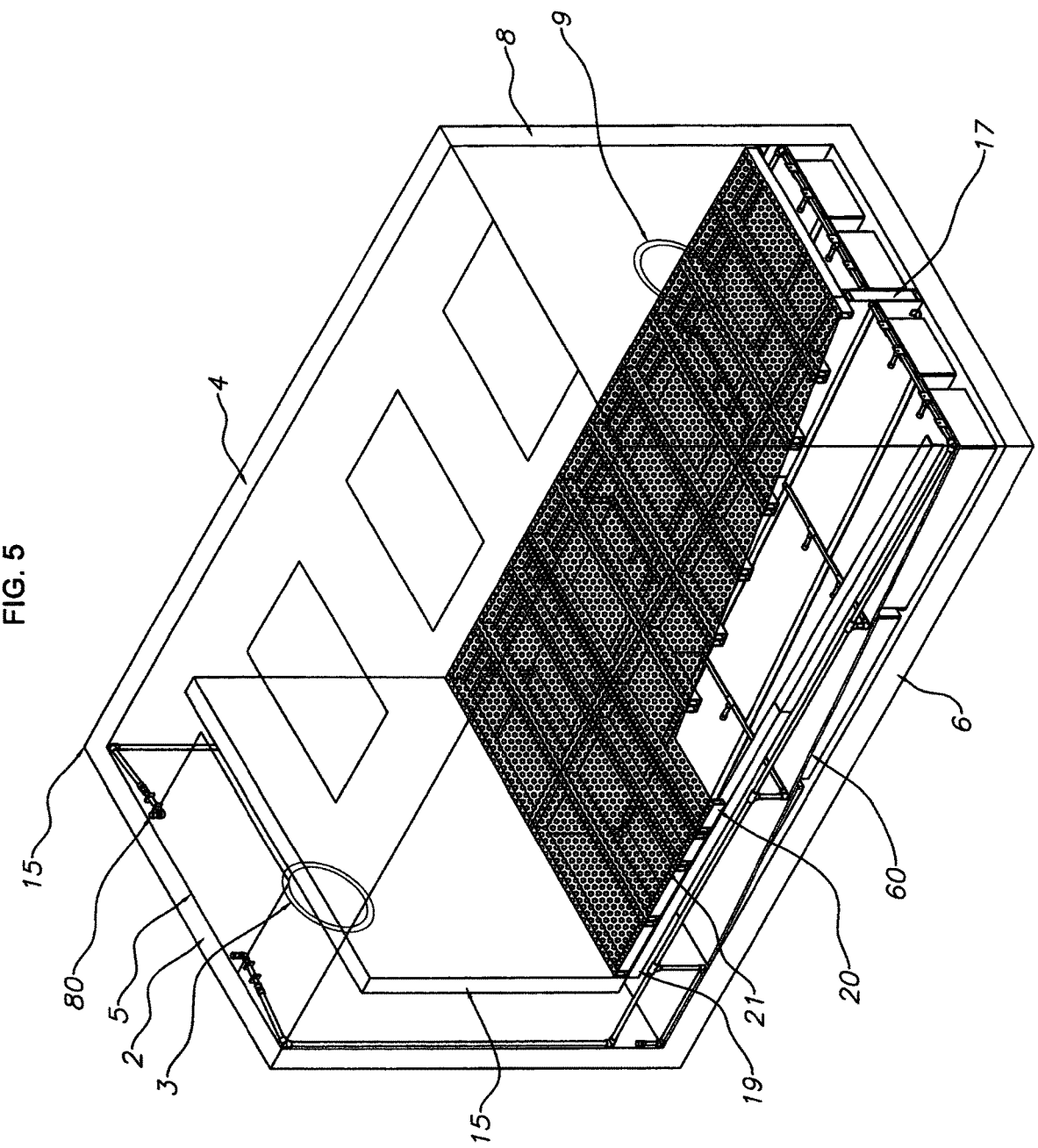
FIG. 5 is an upper front right perspective view partial cut-away of the FIG. 1A filtration system showing the baffle wall and screen and sloped floor without the filtration media.

FIG. 5 is an upper front right perspective view partial cut-away of the FIG. 1A filtration system 1 showing the baffle wall 15 and screen panel 20 and sloped floor 60 without the filtration media 40.

Referring to FIGS. 1A to 5, the filtration system 1 can be located inside a vault having a vault front end wall 2 having an inlet (inflow pipe) 3, vault sides 4, vault floor 6 and vault rear end wall 8 having an outlet (outflow pipe) 9, and access hatches 5 on top of the vault. Storm water can pass into the vault through inlet (inflow pipe) 3 and out the vault through outlet (outflow pipe) 9.

A fixed baffle wall 5 supported by baffle wall support(s) 17 can direct the storm water into a void space between a raised screen panel 20 and the vault floor 6. Attached to an upper end of the baffle wall 5 can be a floating skimmer 10, such as but not limited to the floating skimmer shown and described in U.S. Pat. No. 8,231,780 to Happel, who is the same inventor of the subject application, and which is incorporated by reference. The floating skimmer 10 can rise with the level of storm water in the vault to further prevent incoming storm water from spilling over the top of the upper rock layer 30. The invention is used where incoming storm water is directed down the baffle 15 to pass into the void space between vault floor 6 and screen panel 20 and move upward into the screen panel 20 and rock layers 30 and 50 which sandwich filtration media 40.

The screen panel 20 can be supported above vault floor 6 by support angle(s) 19. The screen panel 20 can be a metal screen having openings of approximately ¼ inch. On top of the screen panel 20 can be a lower layer of rocks 50, such as but not limited to river rocks, such as #57 stone, and the like, followed by filtration media 40 with an upper layer of rocks 30, such as but not limited to river rocks, such as #57 stone, on top of the filtration media layer 40. The filtration media can be approximately 2 inches to approximately 4 inches deep, with individual particles sizes of approximately ⅛ inch to approximately inch in size. Each of the rocks in the upper rock layer 30 and lower rock layer 50 can be up to approximately twice the size of the particles used in the filtration media.

The filtration media can include particles described in U.S. Pat. Nos. 7,955,507 and 8,002,984 both to Wanielista et al., which are both incorporated by reference.

The filtration media can include a sorption media composition consisting of: at least two of a recycled material and a naturally occurring material. The recycled material can be selected from a group consisting of tire crumb, wood sawdust and compost. The naturally occurring material can be selected from a group consisting of sand, limestone, sandy clay, expanded clay, and peat The filtration media can include the combination of one or more recycled materials in combination with one or more naturally occurring materials. The one or more recycled materials can be selected from a group consisting of selected from a group consisting of tire crumb, sawdust, orange peel, coconut husks, leaf compost, crushed oyster shell, soy bean hulls, tree bark, wood chips, paper, alfalfa, mulch, cotton and wheat straw. The one or more of a naturally occurring materials can be selected from a group consisting of peat, sand, zeolites, limestone, sulfur and clay mixed with the one or more recycled materials.

The filtration media can include other types of material such as but not limited to zeolite, corn cob, wood chips, expansion shale, perlite and combinations thereof.

The rocks used in the rock layers 30, 50 can provide a horizontal conveyance for water passing upward. The top rock layer 30 can be primarily used as a weight to hold down the loose particles in the filtration media layer 40. A second screen panel can be used instead of the top rock layer 30. The bottom rock layer 50 can support the particles of filter media 40 from falling through.

The flow of storm water through the filtration system can function similarly the Floating Skimmer Apparatus with Up-Flow Filter shown and described in reference to U.S. Pat. No. 8,034,234 to Happel, which is the same inventor as in the subject invention, which is incorporate by reference.

The subject invention incorporates a novel sloped floor 60 supported from the vault floor 6 by slope supports 65, with the raised screen panel 20, and rock layers 30, 50 which sandwich a filtration media 40 therebetween. Water lines 80 can direct pressurized water from outside the vault to sprayers 70 that can be located under the screen panel 20 at the low point of the sloped floor 60 and at different positions above and the sloped floor between the vault front end 2 and the vault rear end 8. The lines of sprayers 70 can include The novel invention allows for the void space between the screen panel 20 and the vault floor 6 to be more easily serviced.

Debris passing into the vault can easily become captured in this space. In addition pollutants and nutrients can be prevented from rising upward through the screen panel 20, lower rock layer 50, filtration media layer 40 and top rock layer 30. The sloped floor 60 allows for sediment and debris and other pollutants to drop from the screen panel 20, rock layers 30, 50 and filtration media 40 to land on the sloped floor 60 and slide downward toward the lower end of the sloped floor 60. The sprayers 70 can further move the debris and pollutants to slide down the sloped floor 60. The sprayers 70 can have pressures of approximately 300 PSI and up.

The sprayers 70 can liquefy the captured debris which will also allow it to easily slide down the sloped floor 60. A vacuum truck with vacuum line having a lower end positioned adjacent the low point of the sloped floor 60 so that the small and liquefied debris can be easily vacuumed out of the vault.

The sprayers 70 can be attached to sidewalls of the vault, as well as to the floor. The sprayers 70 that can be single pipes with holes, and connected to water lines 80. The locations and positions of the sprayers 70 can be arranged in various configurations and arrangements, as shown and described in U.S. patent application Ser. No. 14/288,455 filed May 28, 2014, to the same inventor of the subject application, which is incorporated by reference.

The filtration media 40 and rock layers 30, 50 can be periodically cleaned by backwashing water through the vault, which can include running water from above the top layer of rocks 30 through the filtration media 40 and bottom rock layer 50.

The novel filtration system 1 avoids technology that avoids typical head losses during high flow events. This enables the placement of filtration media in line with existing pipes without a significant impact on flow. The filtration media bed is in an up flow fluidized configuration which enables the system to be resistant to clogging.

In no flow states, which are between rain events, the filtration media and rock layers remain stable. Typically for nutrient specific granular media, biological activity on the surface of the media and water begin to consume contaminants captured by the media, and over time the denitrification process accelerates. Every time the rain event begins and ends the media can shift and break apart any clogs that may have begun to form in the media During low to medium flows, all the water flow is directed to force water up through the filtration media and rock layers. Sediments and other solids will settle into the lower void space below the filtration media and rock layers.

During high flows the float skimmer rises and water can flow over the top of the filtration media and rock layers to the outlet of the vault.

Figure 6B:
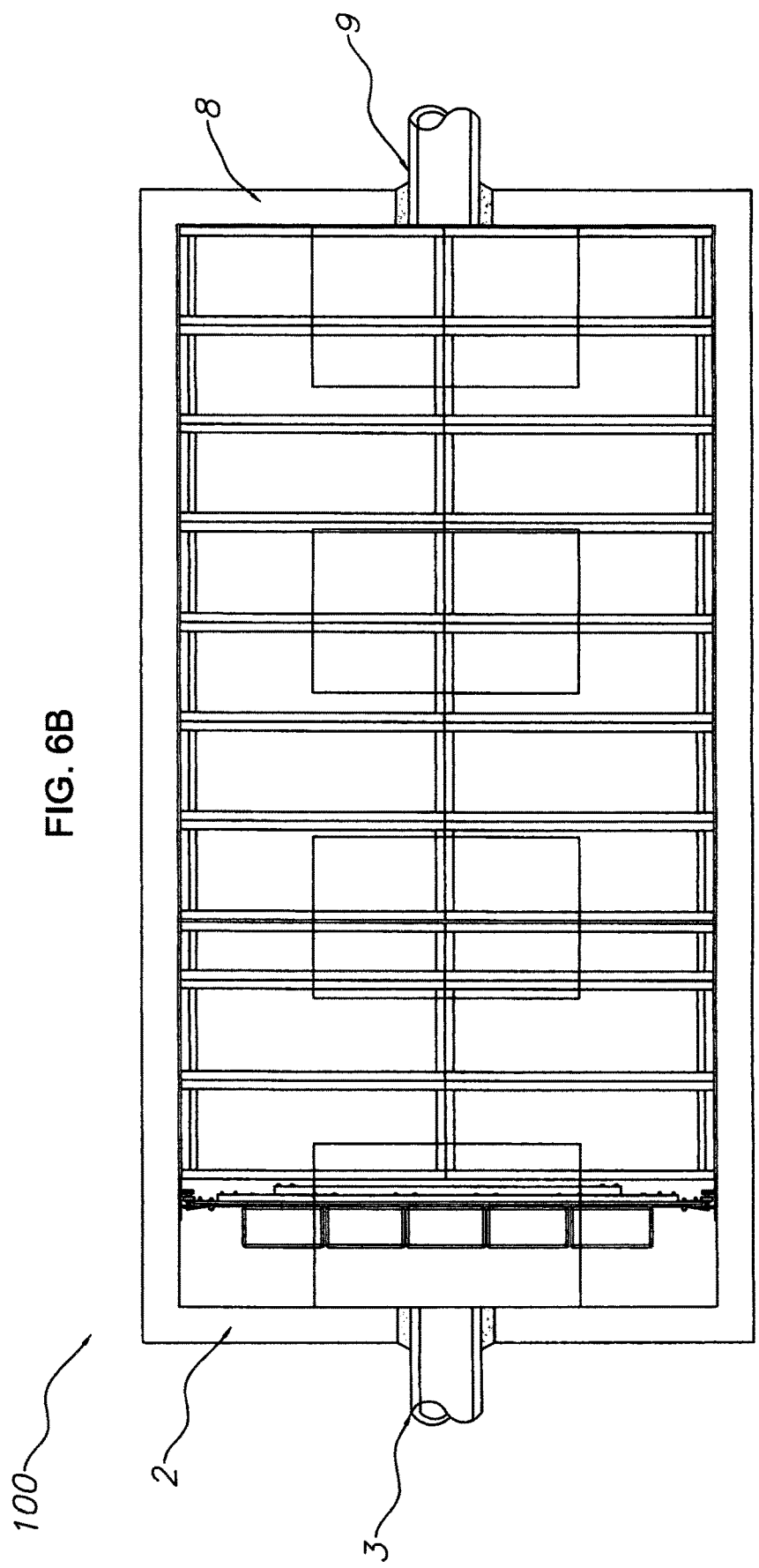
FIG. 6B is a top view of the filtration system of FIG. 6A along arrow 6B.
Figure 6C:
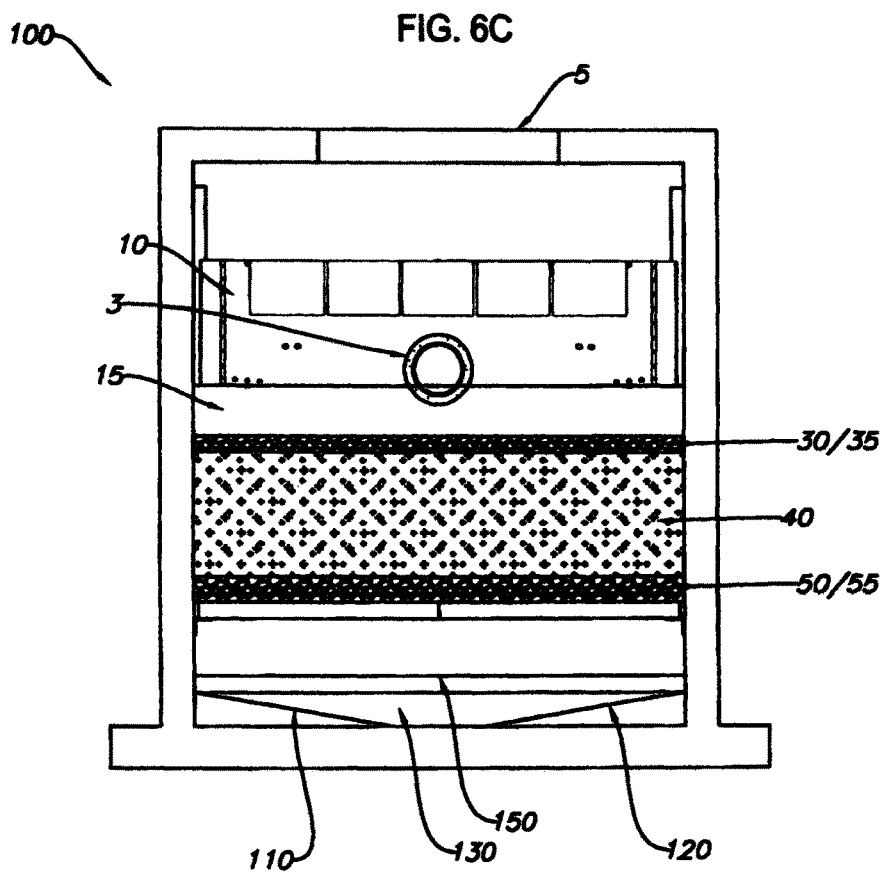
FIG. 6C is an inlet end view of the filtration system of FIG. 6A along arrow 6C.
Figure 6D:
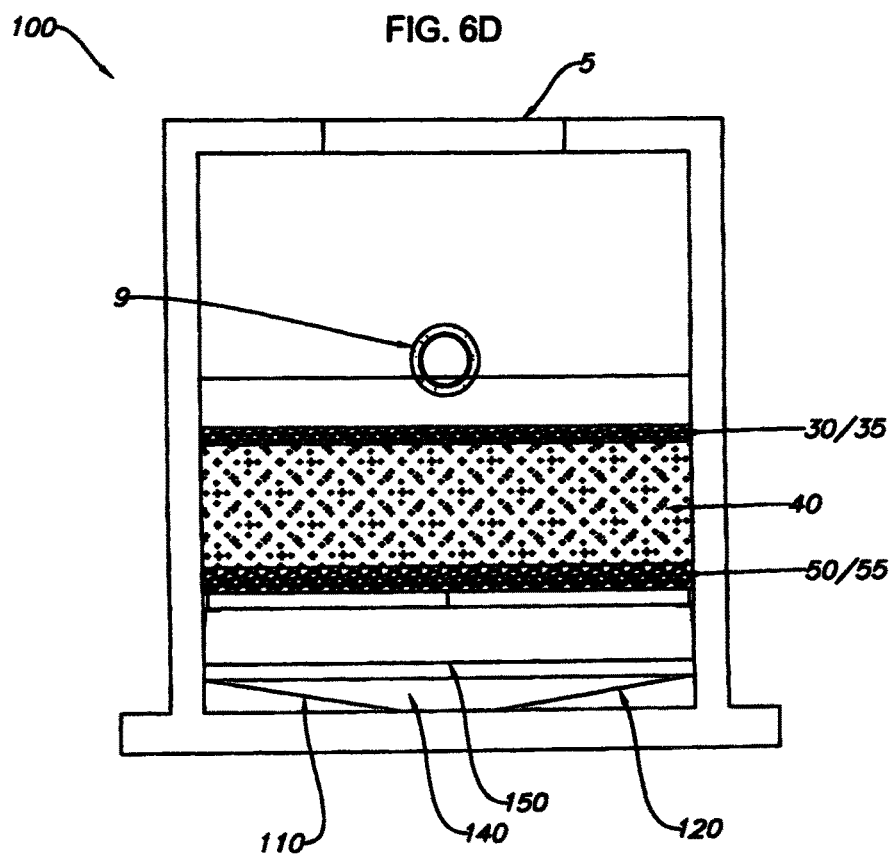
FIG. 6D is an outlet end view of the filtration system of FIG. 6A along arrow 6D.

FIG. 6A is a front side view of a second embodiment of the nutrient removal filtration system 100 with a first slope floor 110 and second sloped floor 120. FIG. 6B is a top view of the filtration system 100 of FIG. 6A along arrow 6B. FIG. 6C is an inlet end view of the filtration system 100 of FIG. 6A along arrow 6C. FIG. 6D is an outlet end view of the filtration system 100 of FIG. 6A along arrow 6D.

Referring to FIGS. 6A to 6D, the second embodiment filtration system 100 can include similar components to the previous embodiment. Here, the floor can include a first side sloped floor 110 and a second side sloped floor 120, as well as a left sloped floor 130 and a right sloped floor 140.

The first side sloped floor 110 on the bottom of the vault can have an upper end adjacent to one side of the vault and a lower end adjacent to a middle portion of the vault. The second side sloped floor 120 on the bottom of the vault can have an upper end adjacent to another side of the vault and a lower end adjacent to the middle portion of the vault. A left sloped floor 130 can have a low end adjacent to the inlet to the vault and a high end adjacent to a center of the vault supported by a middle baffle 150. A right sloped floor 140 can have a low end adjacent to the outlet to the vault and a high end adjacent to the center of the vault supported by the middle baffle 150.

Sediment and debris from the screen and media can fall and slide downward toward the lower end of the first side sloped floor 110 and downward to the lower end of the left sloped floor 130 in a downward funnel configuration. Sediment and debris from the screen and media can also fall and slides downward toward the lower end of the second sloped floor 120 and downward to the lower end of the right sloped floor 149 also in a downward funnel configuration.

Although not shown, sprayers 80 can be positioned to both liquefy and direct the debris and pollutants to the front inlet end 2 and rear inlet end 8 of the vault for pickup by vacuum lines similar to the previous embodiment.

In addition the rock layers 30, 50 can be replaced with limestone layers 35, 55. In addition a screened panel 20 can also be used in a similar configuration to the previous embodiment.

The storm water treatment vaults can be retrofitted with slope floors (subfloors. Additionally, the floors of the storm water treatment vaults can be concrete poured into sloped surfaces when the vaults are built.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A nutrient removal filtration system, comprising:
   a generally horizontal lower metal screen having openings of approximately ¼ inch, supported above a bottom of an in-flow vault, with a void space formed between the bottom and the screen;
   a lower layer of loose rocks on the lower metal screen;
   a filtration media of particles resting on the lower layer of loose rocks, the filtration media of particles includes a combination of loose recyclable particles and loose natural particles, wherein storm water flowing into the vault through an inlet passes into the void space and up through the screen and filtration media and out the vault through an outlet, so that contaminants, metals, nutrients and solids are removed from the storm water by the filtration system.

2. The nutrient removal filtration system of claim 1, further comprising;
   an upper layer of loose rocks above the filtration media of particles.

3. The nutrient removal filtration system of claim 2 further comprising:
   a top metal screen having openings of approximately ¼" on top of the second layer of loose rocks.

4. The nutrient removal filtration system of claim 2, wherein the upper layer of loose rocks include river rocks.

5. The nutrient removal filtration system of claim 2, wherein each of the lower layer of rocks and each of the upper layer of rocks is up to approximately twice the size of filtration media particles.

6. The nutrient removal filtration system of claim 1, further comprising:
   a top metal screen having openings of approximately ¼" above the filtration media.

7. The nutrient removal filtration system of claim 1, wherein the lower layer of loose rocks include river rocks.

8. The nutrient removal filtration system of claim 1, wherein the loose recyclable particles are selected from a group comprising tire crumb, sawdust, orange peel, coconut husks, leaf compost, crushed oyster shell, soy bean hulls, tree bark, wood chips, paper, alfalfa, corn, mulch, cotton and wheat straw, and the loose natural particles are selected from another group comprising peat, sand, zeolites, limestone, sulfur and clay mixed with the one or more recycled materials.

9. The nutrient removal filtration system of claim 1, wherein the filtration media of particles is approximately 2 inches to approximately 4 inches deep.

10. The nutrient removal filtration system of claim 1, wherein the filtration media of particles includes particle sizes of between approximately ⅛ of an inch to approximately ½ inch in size.

11. The nutrient removal filtration system of claim 1, wherein each of the lower layer of rocks is up to approximately twice the size of filtration media particles.

12. A nutrient removal filtration system, comprising:
a generally horizontal lower metal screen having openings of approximately ¼ inch supported above a bottom of a treatment vault, with a void space formed between the bottom and the screen;
a filtration media of particles resting on the lower metal screen, the filtration media of particles includes a combination of loose recyclable particles and loose natural particle, wherein storm water flowing into the vault through an inlet passes into the void space and up through the screen and filtration media and out the vault through an outlet, so that contaminants, metals, nutrients and solids are removed from the storm water by the filtration system;
a floor on the bottom of the vault wherein sediment and debris from the screen and media falls and slides to the floor.

13. The nutrient removal filtration system of claim 12 further comprising:
a generally horizontal top metal screen having openings of approximately ¼ inch on top of the filtration media of particles.

14. The nutrient removal filtration system of claim 12, wherein the loose recyclable particles are selected from a group comprising tire crumb, sawdust, orange peel, coconut husks, leaf compost, crushed oyster shell, soy bean hulls, tree bark, wood chips, paper, alfalfa, corn, mulch, cotton and wheat straw, and the loose natural particles are selected from another group comprising peat, sand, zeolites, limestone, sulfur and clay mixed with the one or more recycled materials.

15. The nutrient removal filtration system of claim 12, further comprising:
a first layer of a combination of loose rocks and a first limestone layer above the filtration media of particles, and
a generally horizontal top metal screen having openings of approximately ¼ inches on top of the filtration media of particles.

16. The nutrient removal filtration system of claim 15, further comprising:
a second layer selected from another combination of additional loose rocks and a second limestone layer, between the filtration media and the generally horizontal top metal screen.

17. A nutrient removal filtration system, consisting of:
a generally horizontal lower metal screen having openings of approximately ¼ inch, supported above a bottom of an in-flow vault, with a void space formed between the bottom and the screen;
a lower layer of loose river rocks on the lower metal screen;
a filtration media of particles resting on the lower layer of loose rocks, the filtration media of particles includes a combination of loose recyclable particles and loose natural particles, wherein storm water flowing into the vault through an inlet passes into the void space and up through the screen and filtration media and out the vault through an outlet, so that contaminants, metals, nutrients and solids are removed from the storm water by the filtration system, wherein the filtration media of particles includes particle sizes of between approximately ⅛ of an inch to approximately ½ inch in size, and wherein each of the lower layer of rocks is up to approximately twice the size of filtration media particles.

18. A nutrient removal filtration system, consisting of:
a generally horizontal lower metal screen having openings of approximately ¼ inch, supported above a bottom of an in-flow vault, with a void space formed between the bottom and the screen;
a lower layer of loose river rocks on the lower metal screen;
a filtration media of particles resting on the lower layer of loose rocks, the filtration media of particles includes a combination of loose recyclable particles and loose natural particles, wherein storm water flowing into the vault through an inlet passes into the void space and up through the screen and filtration media and out the vault through an outlet, so that contaminants, metals, nutrients and solids are removed from the storm water by the filtration system,
wherein the filtration media of particles includes particle sizes of between approximately ⅛ of an inch to approximately ½ inch in size,
wherein each of the lower layer of rocks is up to approximately twice the size of filtration media particles; and
a generally horizontal top metal screen having openings of approximately ¼ inches on top of the filtration media of particles.

19. A nutrient removal filtration system, consisting of:
a generally horizontal lower metal screen having openings of approximately ¼ inch, supported above a bottom of an in-flow vault, with a void space formed between the bottom and the screen;
a lower layer of loose river rocks on the lower metal screen;
a filtration media of particles resting on the lower layer of loose rocks, the filtration media of particles includes a combination of loose recyclable particles and loose natural particles, wherein storm water flowing into the vault through an inlet passes into the void space and up through the screen and filtration media and out the vault through an outlet, so that contaminants, metals, nutrients and solids are removed from the storm water by the filtration system,
wherein the filtration media of particles includes particle sizes of between approximately ⅛ of an inch to approximately ½ inch in size; and
an upper layer of loose river rocks on top of the filtration media of particles, wherein each of the lower layer of rocks and each of the upper layer of loose river rocks is up to approximately twice the size of filtration media particle.

* * * * *